Feb. 22, 1927. 1,618,807
C. F. BULLOCK
INTEGRATING AND REGISTERING MECHANISM FOR FLOW METERS AND THE LIKE
Filed Nov. 11, 1922   2 Sheets-Sheet 1

Inventor:
Charles F. Bullock,
by *Alexander D. Lunt*
His Attorney.

Feb. 22, 1927.  1,618,807
C. F. BULLOCK
INTEGRATING AND REGISTERING MECHANISM FOR FLOW METERS AND THE LIKE
Filed Nov. 11, 1922    2 Sheets-Sheet 2
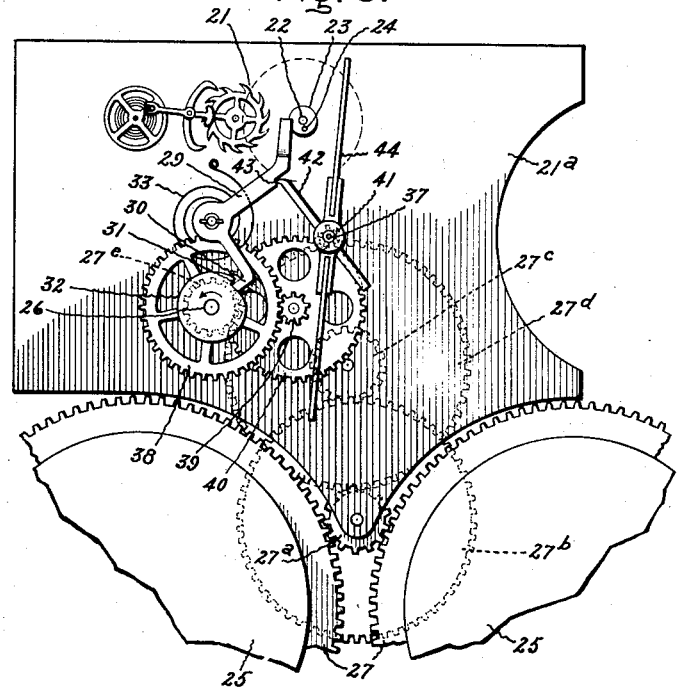
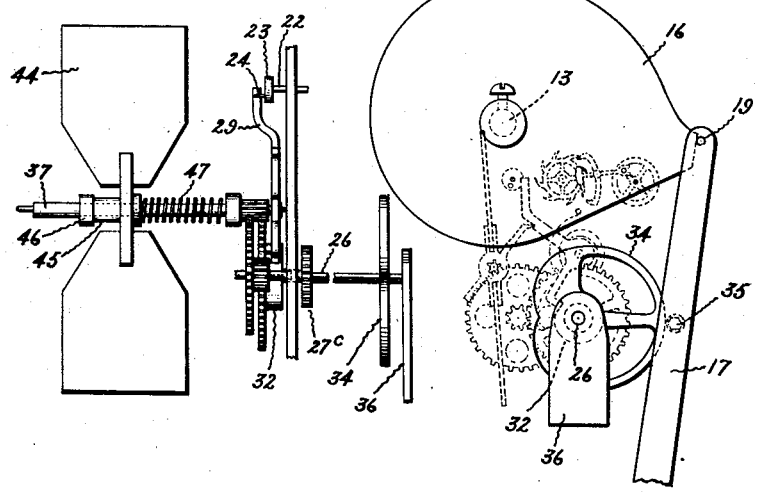
Inventor:
Charles F. Bullock.
by
His Attorney.

Patented Feb. 22, 1927.

1,618,807

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

INTEGRATING AND REGISTERING MECHANISM FOR FLOW METERS AND THE LIKE.

Application filed November 11, 1922. Serial No. 600,387.

The present invention relates to integrating and registering mechanisms such as are used in connection with flow meters and the like.

The object of my invention is to provide an improved mechanism of this character which is simple in structure and reliable and accurate in operation, and for a consideration of what I believe to be novel and my invention, attention is directed to the accompanying description and the claims appended thereto.

My invention is well adapted for use in connection with flow meters for integrating and registering the flow of fluid through conduits and I have particularly illustrated and described my invention as applied to this use. It will be understood, however, that my invention is not necessarily limited thereto.

Figure 1:
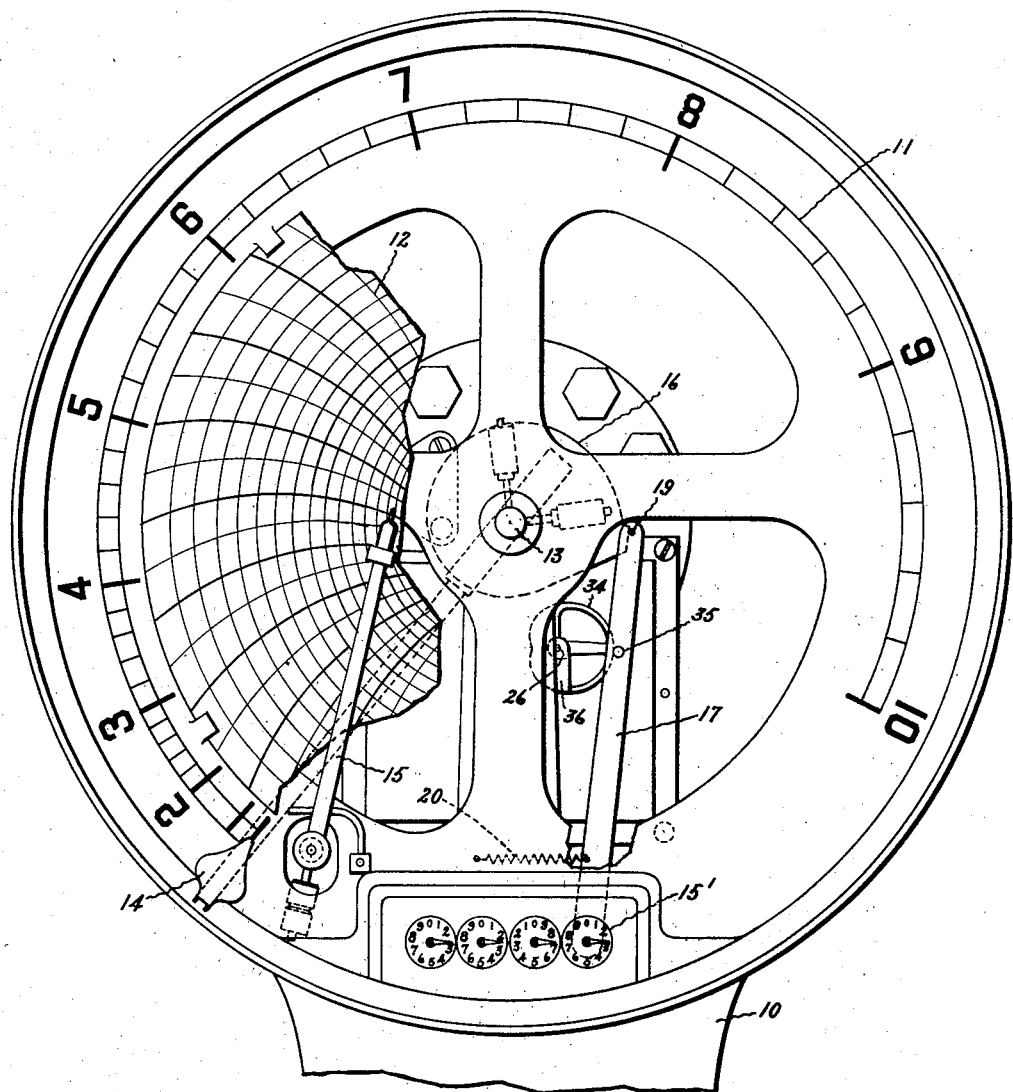
Figure 2:
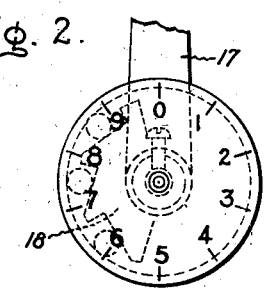

In the drawing, Fig. 1 is a face view of a flow meter embodying my invention, certain parts being broken away; Fig. 2 is a detail view of a ratchet mechanism; Fig. 3 is a detail view of certain parts; Fig. 4 is a side view of parts shown in Fig. 3; and Fig. 5 is a detail view of certain parts.

Referring to the drawing, 10 indicates the upper portion of the casing of a flow meter, 11 the scale plate and 12 the chart. 13 is the shaft which is turned by the mechanism of the meter in response to changes in the rate of flow, and connected to it is a pointer 14 which moves over scale plate 11. Movement of shaft 13 serves also to position recording pen 15 which traces a record on chart 12. Shaft 13 may be turned in response to flow of fluid by any suitable flow meter mechanism such mechanisms being known in the art and it will be understood that the amount of this turning movement bears a definite relation to the rate of flow. The particular meter mechanism which turns shaft 13 forms no part of the present invention and hence it is not illustrated.

A registering mechanism is indicated at 15' and my invention relates particularly to the means for actuating it in accordance with the turning movement of shaft 13 so as to register the total flow.

On shaft 13 is a cam 16 which is positioned by the shaft and is accurately made and shaped to effect the transmission of movements to the registering mechanism which movements are directly proportional to the flow of the fluid being integrated. The registering mechanism is actuated by a lever arm 17 connected to it by a ball type ratchet mechanism 18. On the other end of the lever arm 17 is a pin 19 which strikes on the edge of cam 16 and is baised toward it by a spring 20. The ratchet mechanism is such that when arm 17 moves toward the left in Fig. 1 the registering mechanism is not turned while when arm 17 moves toward the right it is turned.

21 indicates a clock train mechanism mounted in a frame 21ª and driven by a suitable spring (not shown). The clock train has a projecting shaft end 22 on which is mounted a disk 23 which carries a trip pin 24. The clock train mechanism may be of any suitable structure and is illustrated only diagrammatically in the drawing. It is only essential that it drive continuously the disk 23 and trip pin 24.

At 25 is a spring motor which drives a shaft 26 through a suitable train of gearing comprising gear wheels 27, pinion 27ª, gear wheel 27ᵇ, pinion 27ᶜ, gear wheel 27ᵈ and pinion 27ᵉ, mounted in frame 21ª. Pivoted adjacent shaft 26 is a catch lever or trip lever 29 provided at one end with a nose 30 which engages a notch 31 in a control disk 32 fixed on shaft 26. Catch lever 29 is biased toward disk 32 by a spring 33 and when nose 30 is in notch 31 the end of the catch lever remote from nose 30 stands in the path of movement of trip pin 24. Shaft 26 extends entirely through the frame which carries the clock train and on its other end is mounted a heart-shaped actuating cam 34 the edge of which engages a pin 35 on lever arm 17. This end of shaft 26 is supported in a bracket 36. It will thus be seen that spring motor 25 drives shaft 26 which is journaled in and extends entirely through frame 21ª and that, on one side of the frame, shaft 26 carries control disk 32 and on the other side of the frame it carries cam 34.

Mounted adjacent to shaft 26 is a shaft 37 which is connected to shaft 26 by a gear train comprising gear wheel 38, pinion 39, gear wheel 40 and pinion 41. On shaft 37 is a locking pawl 42 which engages a notch 43 in catch lever 29 to lock shafts 26 and 37 against turning. Spring motor 25 acts on shaft 37 in a direction to turn shafts 26 and 37 anti-clockwise, as shown in Fig. 3, and hence to force pawl 42 against the bottom of notch 43. To regulate the turning movement of shaft 26 by spring motor 25 when the shaft is released, a brake is provided in the form of a fan 44 having a hub 45 mounted loosely on shaft 37. On shaft 37 is a collar 46 against which the end of hub 45 is forced by a spring 47 thereby establishing a friction connection between the fan and the shaft.

The operation is as follows: with any definite flow, shaft 13, and hence cam 16, will be turned to a corresponding position under which circumstances the edge of cam 16 will be spaced a certain distance from pin 19 on lever arm 17, which distance bears a definite relation to the rate of flow. The position of cam 16 indicated in the drawing, is that of zero flow, the edge of cam 16 being then against pin 19 so arm 17 cannot move toward the left. With increase in flow the edge of cam 16 will be moved farther away from pin 19. When trip pin 24 strikes the end of catch lever 29, the lever is turned to move notch 43 out from under pawl 42 thereby releasing shafts 26 and 37 which start to turn under the influence of spring motor 25. As soon as shaft 26 starts to turn, control disk 32 is moved to bring nose 30 out of notch 31, the nose then resting on the periphery of the disk. The shape of notch 31 is such that the rotation of disk 32 lifts catch lever 29 away from trip pin 24, thus releasing any load caused by pin 24. Control disk 32 also serves to hold catch lever 29 out of the way of pawl 42 until disk 32 has made one complete revolution and nose 30 has dropped back into notch 31. In the meantime the continuous rotation of shaft 23 has carried trip pin 24 out of the way so that catch lever 29 will not strike it when nose 30 drops back into notch 31. As shaft 26 revolves, heart-shaped cam 34 moves away from pin 35 permitting lever arm 17 to move toward the left in Fig. 1 under the influence of spring 20 until pin 19 engages the edge of cam 16. During the first half of its turning movement cam 34 moves away from pin 35 while during the second half of its turning movement it moves toward pin 35. The maximum distance cam 34 can move away from pin 35 is equal to or just slightly greater than the distance between the edge of cam 16 and pin 19 at maximum flow. During the second half of its turning movement cam 34 engages pin 35 and brings lever arm 17 back to its normal, original position. Lever arm 17 is thus given a forward and back movement through an angular distance proportional to the flow at the particular instant and during the back movement ratchet mechanism 18 turns the registering mechanism 15′ a corresponding amount. Upon the completion of one revolution of cam 34 nose 30 drops back into notch 31 whereupon pawl 42 will strike into notch 43 thus stopping further turning movement. In other words, the pawl again locks shaft 26. Since fan 44 is connected to shaft 37 only by the friction between hub 45 and collar 46, it can revolve on shaft 37 after such shaft is locked by pawl 42. This serves to take the strain off shaft 37 and the gear train when the shaft is stopped, as it permits the fan to come gradually to rest independently of the shaft.

The cycle of operation just described is repeated at suitable intervals. For example, disk 23 may make one revolution per minute which would mean that once each minute heart-shaped cam 34 would be released and permitted to make one revolution. Cam 34 may revolve at any suitable speed. For example, the arrangement may be such that cam 34 makes a complete revolution in about six seconds. These examples as to intervals of operation are some which I have found satisfactory in commercial practice, but it will be understood that they are only by way of illustration and are not to be taken as limitations of my invention.

With the above-described arrangement it will be seen that the registering mechanism is operated by a means entirely separate from the clock mechanism. All the clock mechanism is required to do is to release pawl 42 at the desired intervals thus releasing the operating means for the registering mechanism. This means that the clock is required to do no heavy work and hence its accuracy and reliability are not affected. Also, spring motor 25 may be made as strong as desired so as to perform the work required of it in a satisfactory manner.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a mechanism of the character described, the combination with a device to be operated, of means for operating it comprising a spring motor, a shaft, a train of gearing connecting the motor to the shaft, a controlling disk and an actuating cam on said shaft, said disk having a notch in its periphery, a trip lever having an end which engages said notch, a second shaft, a locking pawl on the second shaft which engages the trip lever, a train of gearing connecting the second shaft to the first-named shaft, and a clock-driven member for periodically releasing the locking pawl.

2. In a mechanism of the character described, the combination of a device to be operated, means including a shaft for operating the device, a spring motor, a gear train connecting the motor to the shaft, a catch lever, a second shaft, a locking pawl on the second shaft which pawl engages the catch lever, a second gear train connecting said second shaft to the first-named shaft, and an independent clock-driven member for moving said catch lever from engagement with the locking pawl.

3. In a mechanism of the character described, the combination of a device to be operated, means including a shaft for operating the device, a spring motor, a gear train connecting the motor to the shaft, a catch lever, a second shaft, a locking pawl on the second shaft which pawl engages the catch lever, a second gear train connecting said second shaft to the first-named shaft, a brake fan on said second shaft, and an independent clock-driven member for moving said catch lever from engagement with the locking pawl.

In witness whereof, I have hereunto set my hand this 10th day of November 1922.

CHARLES F. BULLOCK.